United States Patent [19]

Gartland

[11] Patent Number: 4,782,204
[45] Date of Patent: Nov. 1, 1988

[54] ADAPTER FOR CONTROL OF GAS FLOW TO A GAS-CONSTRICTED ARC NOZZLE OR THE LIKE

[75] Inventor: Thomas J. Gartland, Huntington Station, N.Y.

[73] Assignee: Eutectic Corporation, Flushing, N.Y.

[21] Appl. No.: 53,737

[22] Filed: May 26, 1987

Related U.S. Application Data

[63] Continuation of Ser. No. 850,626, Apr. 11, 1986, abandoned.

[51] Int. Cl.⁴ .................................. F16K 31/128
[52] U.S. Cl. .................................. 219/74; 251/33; 251/43
[58] Field of Search .............. 251/33, 36, 43, 44, 251/46, 47, 61.3, 40, 45, 30.1; 219/74, 75, 219; 137/1

[56] References Cited

U.S. PATENT DOCUMENTS

| | | | |
|---|---|---|---|
| 862,867 | 8/1907 | Eggleston | 251/61 X |
| 993,628 | 5/1911 | Williams | 251/46 X |
| 1,202,499 | 10/1916 | Fivey | 251/43 |
| 1,466,412 | 8/1923 | Samain | 251/36 X |
| 1,646,640 | 10/1927 | Daniel | 251/43 X |
| 2,329,001 | 9/1943 | Robinson | 251/36 |
| 2,532,568 | 12/1950 | Myers | 251/33 X |
| 2,683,580 | 7/1954 | Griswold | 251/41 X |
| 2,753,664 | 7/1956 | Garver | 251/33 X |
| 2,833,304 | 5/1958 | Fish | 251/46 X |
| 3,132,235 | 5/1964 | Anderson | 219/75 |
| 3,241,804 | 3/1966 | Bjorklund | 251/41 |
| 4,175,225 | 11/1979 | Holko et al. | 219/74 X |
| 4,445,522 | 5/1984 | Schmid | 137/561 R X |

Primary Examiner—A. Michael Chambers
Assistant Examiner—John C. Fox
Attorney, Agent, or Firm—Hopgood, Calimafde, Kalil, Blaustein & Judlowe

[57] ABSTRACT

The invention contemplates an adapter for easily converting existing gas metal arc welding apparatus to serve the relatively elevated gas-flow requirements of a gas-constricted arc nozzle.

The adapter makes it possible to utilize a shop-air or other high-capacity source of pressurized gas, in substitution for a conventional gas cylinder, and in making the substitution the existing solenoid valve and its controls remain without change except that the solenoid valve becomes the control, for pilot operation of a main valve forming part of the adapter.

9 Claims, 1 Drawing Sheet

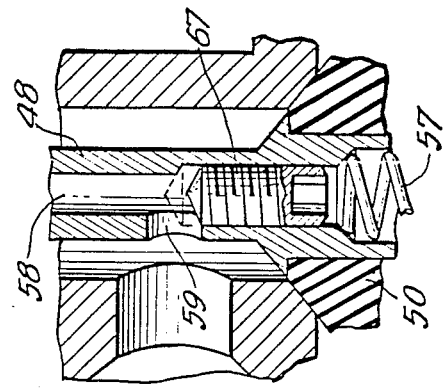
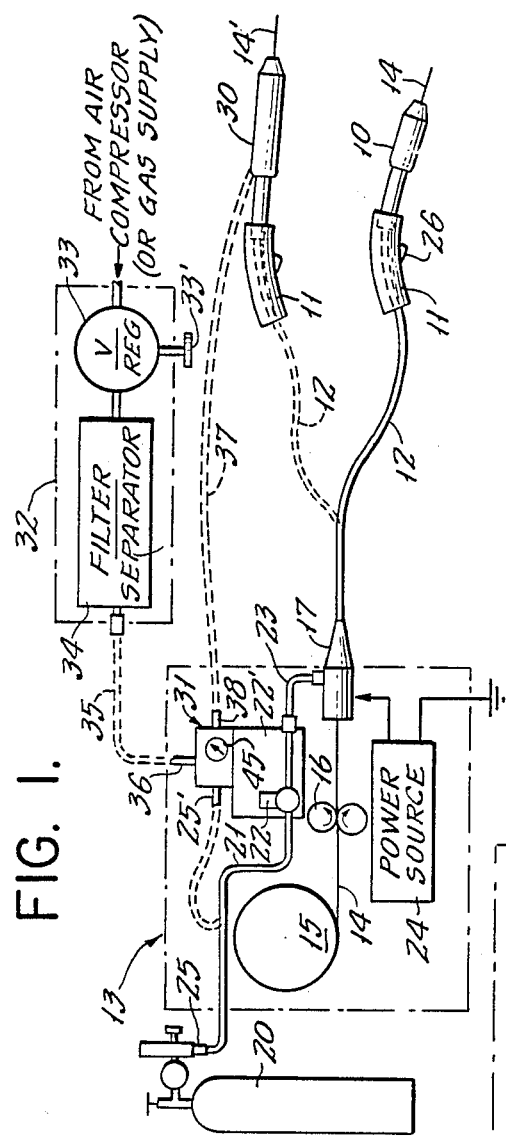
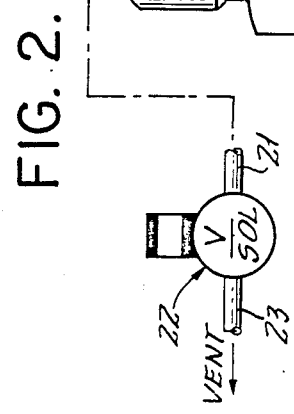
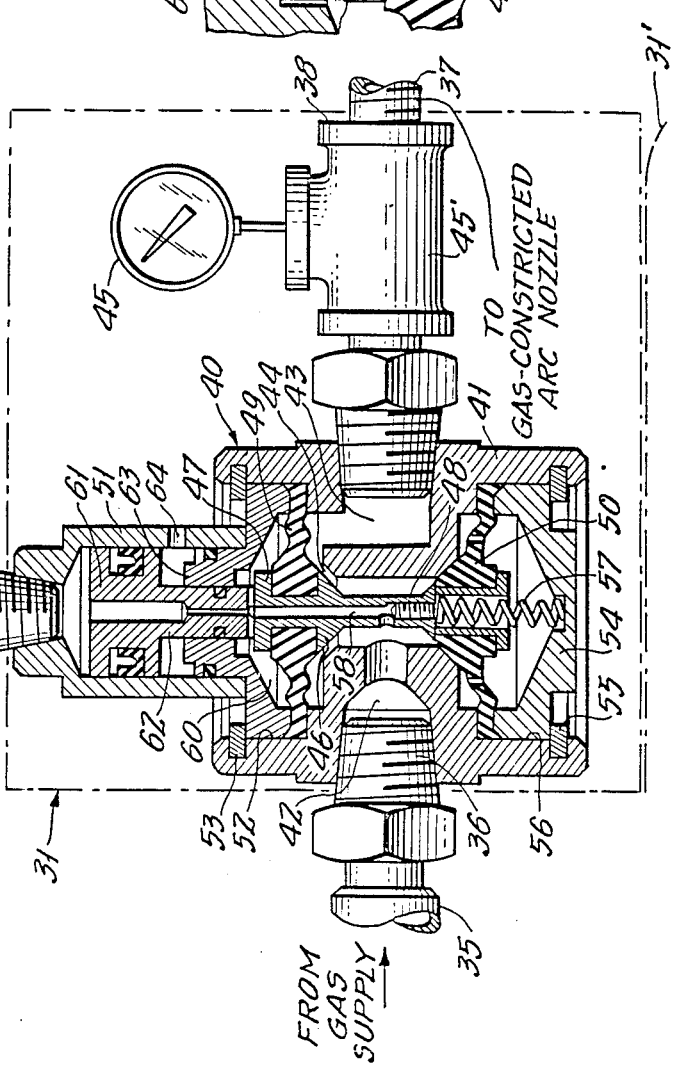
FIG. 1.
FIG. 2.
FIG. 3.
FIG. 4.

ADAPTER FOR CONTROL OF GAS FLOW TO A GAS-CONSTRICTED ARC NOZZLE OR THE LIKE

This is a continuation of copending application Ser. No. 850,626, filed Apr. 11, 1986, for which a Notice of Allowance was mailed on Mar. 2, 1987, now abandoned.

BACKGROUND OF THE INVENTION

The invention relates most immediately to means for serving the relatively elevated gas-flow requirements of a gas-constricted arc nozzle, as shown and described in pending patent applications, U.S. Ser. No. 824,525, filed Jan. 31, 1986, and U.S. Ser. No. 850,690, filed on even date herewith.

Reference is made to said applications for description of such nozzles, and it suffices here to state that it is expected that the gas-constricted arc nozzle will for many applications displace the familiar gas-shielded electric-arc nozzle which has seen widespread use for welding and like operations. Thus, throughout the world, shops utilizing gas metal arc welding (GMAW) apparatus already possess the supporting equipment necessary for operation of their conventional nozzles. Such supporting equipment includes an electric power supply for operation of the arc, wire-feeding mechanism for feeding consumable electrode material to an arc-discharge nozzle, flexible hose (1) for supplying electrical current to a host torch body that is fitted with a particular nozzle configuration and (2) for delivering a flow of shielding gas to the torch body and its nozzle, and a gas-flow on/off control means in the form of a solenoid valve. The solenoid valve is actuated to open condition to supply gas (as from a charged cylinder) to the shroud or multiple-jet configuration which serves the arc-shielding function of the torch.

Although gas-constricted arc nozzles of said patent applications can be fitted to the conventional host-torch body, the existing means of gas supply and the existing solenoid valve are not of sufficient capacity to serve the gas-flow requirements of said gas-constricted arc nozzles; these requirements are for relatively high gas-flow rates, over a relatively wide range of flowing back-pressures, e.g., 10 to 100 psi above atmospheric pressure, depending upon the nozzle configuration and the gas-flow patterns that are desired for different working operations. The obvious solution would be to provide each customer with a replacement solenoid valve, but this would require the customer to partly dismantle his existing equipment in order to install a new solenoid valve, and it would also mean an inventory burden in regard to different solenoid specifications, inter alia due to the variety of local voltages in use throughout the world.

BRIEF STATEMENT OF THE INVENTION

It is an object of the invention to provide a gas-supply package having universal adaptability to virtually any and all GMAW host systems, world-wide, for converting the existing GMAW host system so as to provide gas-flow rates and delivery pressures which meet the needs of gas-constricted arc nozzles of the character indicated.

It is a specific object to meet the above object without requiring the dismantling or replacement of the solenoid valve of the GMAW host system; stated in other words, it is a specific object to utilize the existing solenoid valve and its existing electrical connections in serving the elevated gas-supply requirements of the new nozzle, thus avoiding any special correction or adaptation in respect of the existing solenoid or its electric supply or control.

A still further object is to meet the above objects with an adapter package which specifically provides quick-opening of the gas-supply line to a gas-constricted arc nozzle and which also provides a controlled delayed-action shut down of the gas-supply line, for a brief cooling function once the electric arc has been shut off.

Briefly stated, the invention achieves the above objects by providing a package which can be mounted to the supporting equipment of any GMAW system and which is equipped with three standard hose connectors, two of which serve the respective inlet and outlet ports of a pressure-operated main valve contained in the package; an indicator of outlet-port pressure is externally viewable. The third or control connector accepts the supply end of the existing hose, which normally would be connected to a container of pressurized gas; and by connecting this hose to the third connector, the existing solenoid valve becomes a means of controlling operation of the main valve.

The source of pressurized gas may be the air-compressor system of the customer's shop; conventionally, such a system provides compressed air at or above 100 psi, and the outlet includes a filter, moisture separator and pressure regulator whereby any desired delivery pressure is readily selected and held, within the range from 5 psi to substantially 100 psi. A flexible-hose connection is made from such a source to the inlet-port connector of the package, while the outlet-port connector is hose-connected for supply of the gas passages of the gas-constricted arc nozzle, which may be mounted to the host torch body, so as to utilize the consumable-electrode wire-feeding mechanism of the host system.

More specifically, the main valve is normally open, and the package includes a restrictive or bleed passage from the inlet port to pressure-responsive actuating means for the main valve. The open condition of the solenoid valve determines a venting of the pressure-responsive actuating means, thereby assuring that the main valve will be open whenever the solenoid valve is actuated to its open condition; on the other hand when the solenoid valve is actuated to its closed condition, the bleed passage allows line pressure to develop slowly at the pressure-responsive actuating means, thereby determining a delay in closure of the main valve, i.e., a timed delay following closure of the solenoid valve. In various situations, the delay-timing requirements may be different, and the disclosed embodiment provides for selective adjustment of this delay.

DETAILED DESCRIPTION

The invention will be described in detail for a preferred embodiment, in conjunction with the accompanying drawings. In said drawings:

FIG. 1 is a schematic overall diagram of a GMAW system to which the adapter package of the invention has been applied;

FIG. 2 is a vertical section through a valve contained in the adapter package of FIG. 1, with an indication of solenoid-valve and other connections thereto; and FIGS. 3 and 4 are enlarged fragmentary vertical sections to show different details of coacting parts in the valve of FIG. 2.

In FIG. 1, a conventional GMAW system is shown in full lines to include a gas-shielded electric-arc nozzle 10 fitted to a host torch body 11 which is flexibly connected by a hose 12 to supporting equipment 13, which may be a fixed installation or a mobile module, depending upon the size and capacity of the system. The hose 12 serves multiple purposes, namely, (a) for the continuous feed of consumable electrode wire or like material 14, from a supply reel 15, via feed rolls 16 and a hose-connection fitting 17, to the point of projection beyond the downstream end of nozzle 10, (b) for the continuous supply of shielding gas, from a charged gas cylinder 20, and via a flexible supply hose 21 to a solenoid valve 22, which acts as a main on/off valve determining whether or not shielding gas is to flow to the inlet-hose connection 23 to fitting 17, and (c) for delivery of electric power from a source 24 to the host-torch body 11, its fitted nozzle 10 and the consumable-electrode projecting therefrom. The gas container 20 is a standard commercial item complete with a suitable regulator valve, a pressure and/or flow indicator and an outlet connector 25, e.g., a standard inert-gas fitting, to enable selective disconnection of supply hose 21 to the system.

The various adjustable and electric-supply and control-features of conventional GMAW systems are neither shown nor described, since they have no relation to the invention. It suffices to note that such features include starting and shut-off controls which may include a trigger 26 at the host torch body 11, as well as existing control-voltage connections (not shown) for operating the solenoid valve 22.

In accordance with the invention, the described existing GMAW system is quickly and economically adapted, to serve the substantially greater gas-flow requirements of a gas-restricted arc nozzle 30, without requiring any replacement, adjustment or other access to the solenoid valve 22; this is done by mounting an adapter unit 31 to a suitably fixed part of the existing supporting unit 13, by disconnecting the existing supply hose 21 at 25 and reconnecting the same at a control-port connection 25' of the adapter unit 31; to avoid confusion, this and other hose connections to serve the gas-constricted arc nozzle 30 are shown by dashed lines. Reliance for pressurized gas is transferred to a different, greater-capacity source, as for example to utilize the local compressed-air facility which is to be found in every GMAW shop. In FIG. 1, such a "shop-air" source is shown at 32 to include a regulator valve 33, with manual means 33' for selective adjustment of regulated pressure delivery, and filter/separator means 34 whereby clean air at selected pressure in the range 5 to 100 psi is delivered by a supply hose 35 to an inlet-port connector 36 of the adapter unit 31. A further flexible hose 37 will be understood to connect an outlet-port connector 38 to the gas-supply inlet of the gas-constricted arc nozzle 30, which is shown to have replaced the existing gas-shielded nozzle 10 in its mounting to the same host-torch body 11 and its supply hose 12; however, it will become clear that although the hose 12 is no longer used for gas supply to the torch body 11, it may nevertheless provide a venting function for relatively insignificant volumes of pressure fluid, upon any opening of the solenoid valve 22.

The contents and operation of adapter unit 31 will be better understood by additional reference to FIGS. 2, 3 and 4, wherein a main valve 40 is seen to comprise a body 41 with an inlet port 42, an outlet port 43, and a valve seat 44 therebetween. A T-fitting 45' in the outlet-line connection serves an externally viewable indicator 45 of outlet pressure and also presents the connection 38 for outlet hose 37.

A valve member 46 is shown in its normally open position with respect to seat 44 and is formed integrally with upper and lower stem portions 47–48 which extend longitudinally in opposite directions. Upper and lower flexible diaphragms 49–50 suspend valve member 46 for limited displaceability within body 41. As shown, the upper diaphragm 49 is sealed to and centrally supports the upper stem portion 47; it is imperforate and is clamped into circumferentially continuous seating by the lower flange of an upper-body member 51, in an upper counterbore 52 of body 41. This seated assembly is retained by a snap ring 53. It will become clear that the upper diaphragm 49 is the pressure-operated means for actuating valve 40. At the lower stem end 48, diaphragm 50 provides similar centrally stabilized positioning of valve member 46 and its stem, but apertures in diaphragm 50 assure that it has nothing to do with the pressure response of valve 40. The flange of a bottom closure 54 is compressionally retained against diaphragm 50, by a snap ring 55 in a lower body counterbore 56, and a compression spring 57 loads the valve stem and its member 46 to the normally open position that is shown.

A bleed-orifice or passage 58 extends within the valve stem, from an opening 59 to the inlet port 42 and continuously upward for discharge to space 60 above the upper diaphragm 49. This space is essentially closed by the upper body member 51 and by its connection 25' for hose to the solenoid valve 22. As shown, upper body member 51 has a cylindrical bore for longitudinally guided and sealed accommodation of a booster piston 61 having a tubular stem 62 that derives concentric piloting from a bushing 63 which is press-fitted to the lower end of the bore of upper body member 51. The lower end of stem 62 abuts the stem portion 47 which carries the main-valve member 46, and a side port 64 in member 51 vents the space beneath piston 61. As seen in FIG. 3, grooves 65 in the lower end of stem 62 allow uninterrupted exposure of the upper side of diaphragm 49 to gas pressure.

In operation, and with solenoid valve 22 open, main valve 40 is also open, to provide desired pressure of shop air in line 37 to the gas-constricted arc nozzle 30; to this end, regulator valve 33 is adjusted at 33' until desired output pressure is observed at 45. In this selected-pressure condition, such air bleeds via passage 58 and is vented to ambient air, e.g., leakage through hose 21 and an opening (not shown) in the host torch body 11. When solenoid valve 22 is actuated to closed position (using existing GMAW control circuitry), the space 60 above diaphragm 49 becomes closed and the closed volume is largely determined by the volume of hose 21; in this circumstance, the bleeding flow in passage 58 builds the pressure above diaphragm 49 at a relatively slow rate, and therefore diaphragm 49 is slow to displace downwardly to the point of seating valve member 46 and closing off shop-air flow in the outlet hose line 37 to nozzle 30. On the other hand, when valve 40 has been closed and solenoid valve 22 is actuated to open condition, the air above diaphragm 49 is quickly vented, allowing spring 57 to crack open the valve and admit shop-air pressure quickly to the underside of diaphragm 49.

The slow-closing action described for solenoid-valve control via adapter 31 will be seen as desirable for providing time-delayed cut off of shop air to nozzle 30, wherein the delay is for blow-down cooling of the nozzle once its power supply is disconnected. This time delay will be a function of bleed-orifice size, as well as volumetric factors, e.g., as determined by hose 21. And for different nozzle configurations and utilizations (e.g., metal cutting, as distinguished from metal gouging), the time delay for such cooling may be various. To provide a measure of time-delay selection, for a given set of apparatus and operational parameters, the bleed orifice may be selectively variable; provision for this feature may be at the upper portion 47 of the valve stem, but in the form shown the lower valve-stem portion 48' is used. Thus, FIG. 4 shows the lower portion 48 of the main valve stem to be threaded and receiving a set screw or needle-valve member 67 having means such as an Allen-type wrench socket for adjustment of threaded advance into the stem, to determine the extent of bleed-port restriction. It will be understood that access for such bleed-port adjustment is readily obtained by temporary removal of snap ring 55 and spring 57.

The outline 31 of FIG. 2 will be understood to schematically designate a simple rectangularly prismatic housing for the adapter of the invention. And the simplicity of its mounting is demonstrated by preferred coating of the underside of this housing 31 with a pressure-sensitive adhesive coat, protected in readiness for installation by a peel-off sheet 31' of adhesive protecting release material. Thus, for the usual situation in which solenoid valve 22 and its electrical controls are contained in a single existing rectangular prismatic housing 22' (FIG. 1), the adapter unit 31 is readily applicable to housing 22' merely by peeling off sheet 31' to expose the pressure-sensitive adhesive coat, for direct contact-pressure adherence to the top of housing 22'.

It will be appreciated that for operation of the invention, the effective valve-open area should exceed that of the solenoid-valve (because the existing solenoid valve is assumed to be inadequate to serve the gas-flow requirements of the gas-constricted arc nozzle 20), and it will be understood that the maximum effective open area of the bleed orifice must be less than that of the solenoid valve, in order for an opening of the solenoid valve to effect a quick opening of the main valve.

What is claimed is:

1. In combination, an existing gas arc welding system adapted to serve the greater gas-supply requirements of a gas-constricted arc nozzle, said existing system including a control unit and a torch body connected to said unit via a flexible hose, and said control unit including a solenoid-operated valve having a gas-supply inlet connection and a supplied-gas outlet connection to said hose for on/off control of shielding-gas flow to the torch body, an adapter comprising a normally-open pressure-operated main valve including pressure-operated valve closing means and having a body with inlet and outlet port connections and a valve member and seat interposed between said port connections for determining flow therebetween, means including a bleed orifice connecting the inlet-port connection to said pressure-operated means, said adapter further including an externally accessible venting-control connection to said pressure-operated means, a connection from the gas-supply inlet connection of said solenoid valve to said venting-control connection, and a pressurized-gas supply connection to said inlet-port connection, whereby selective opening of said solenoid valve will quickly open said main valve via selective venting of said pressure-operated means, and whereby upon solenoid-valve closure a main-valve-closing action is delayed as a function of the restriction at said bleed orifice.

2. The combination of claim 1, further including an externally viewable pressure indicator connected to the outlet-port connection of said valve body.

3. The combination of claim 1, in which said bleed orifice includes means for adjustably varying the effective restrictive area thereof.

4. The combination of claim 1, in which said valve member is integrally formed with a stem which extends longitudinally in opposite directions from said valve member, first and second axially flexible diaphragms respectively suspending said stem within said body and on opposite longitudinal sides of said valve member, one of said diaphragms being impervious to gas flow therethrough and comprising said pressure-operated means, said stem having an internal longitudinal passage extending beyond overlap with said valve member and said one diaphragm, said one diaphragm having an inner side facing said valve member and an outer side facing away from said valve member, said passage being open to the outer side of said one diaphragm, and said bleed orifice being in said stem at a side opening to said passage and on the side of said valve member which is away from said one diaphragm.

5. The combination of claim 1, in which said valve member is integrally formed with a stem which extends longitudinally in opposite directions from said valve member, first and second axially flexible diaphragms respectively suspending said stem within said body and on opposite longitudinal sides of said valve member, one of said diaphragms being impervious to gas flow therethrough and comprising said pressure-operated means, said stem having an internal longitudinal passage extending beyond overlap with said valve member and said one diaphragm, said passage being open to the side of said one diaphragm which is away from said valve member, and said bleed orifice being in said stem at a side opening to said passage and on the side of said valve member which is away from said one diaphragm said pressure-operated means further including a booster piston responsive to pressure attributable to bleed fluid discharged via said passage and oriented for aiding valve-closing displacement of said one diaphragm.

6. The combination of claim 1, in which said valve member is spring urged in the valve-open direction.

7. The combination of claim 1, including a housing for said main valve, said housing having at least one flat side wall coated with a pressure-sensitive adhesive, and a peel-off sheet of release material protecting said adhesive coat, said inlet-port connection and said outlet-port connection and said venting-control connection being at separate externally accessible parts of said housing.

8. The combination of claim 1, including a housing for said main valve and pressure indicator, said housing having at least one flat side wall coated with a pressure-sensitive adhesive, and a peel-off sheet of release material protecting said adhesive coat, said inlet-port connection and said outlet-port connection and said venting-control connection being at separate externally accessible parts of said housing, and in which a pressure indicator is viewable on a side of said housing, said indicator having within said housing a connection to said outlet-port connection.

9. The method of using a normally-open pressure-operated main valve to adapt an exisitng gas arc welding system to serve the greater gas-supply requirements of a gas-constricted arc nozzle, wherein the existing system includes a control unit and a torch body connected to said unit via a flexible hose, and wherein said control unit includes a solenoid-operated valve having a gas-supply inlet connection and a supplied-gas outlet connection to said hose for on/off control of shielding-gas flow to the torch body, and wherein the main valve includes pressure-operated valve-closing means and has a body with inlet and outlet port connections and a valve member and seat interposed between the port connections for determining flow therebetween, which method comprises establishing a bleed connection of the inlet-port connection to the pressure-operated means and a venting-control connection to the pressure-operated means, and connecting the gas-supply inlet connection of the solenoid valve to the venting-control connection, whereby upon connecting a pressurized-gas supply to the inlet-port connection, the selective operation of the solenoid valve will operate the main valve by selective venting of the pressure-operated means, such operation being with a main-valve-closing action that is delayed as a function of restriction in the bleed connection.

* * * * *